(12) United States Patent
Takeshita

(10) Patent No.: US 10,151,442 B2
(45) Date of Patent: Dec. 11, 2018

(54) LIGHT ENVIRONMENT PRODUCING APPARATUS

(71) Applicant: PANASONIC INTELLECTUAL PROPERTY MANAGEMENT CO., LTD., Osaka (JP)

(72) Inventor: Hironori Takeshita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/868,533

(22) Filed: Jan. 11, 2018

(65) Prior Publication Data

US 2018/0202629 A1    Jul. 19, 2018

(30) Foreign Application Priority Data

Jan. 18, 2017    (JP) .................................. 2017-007123

(51) Int. Cl.
| | |
|---|---|
| F21V 3/04 | (2018.01) |
| H05B 33/08 | (2006.01) |
| H05B 37/02 | (2006.01) |
| F21Y 113/13 | (2016.01) |
| F21Y 115/10 | (2016.01) |

(52) U.S. Cl.
CPC .......... *F21V 3/049* (2013.01); *H05B 33/0845* (2013.01); *H05B 33/0857* (2013.01); *F21Y 2113/13* (2016.08); *F21Y 2115/10* (2016.08); *H05B 37/0272* (2013.01)

(58) Field of Classification Search
CPC . F21V 13/10; F21V 9/02; F21V 3/049; H05B 33/0845; H05B 33/0857
See application file for complete search history.

(56) References Cited

U.S. PATENT DOCUMENTS

| | | | |
|---|---|---|---|
| 2008/0049282 A1* | 2/2008 | Moss .................... | G02B 5/0252 359/23 |
| 2010/0328554 A1* | 12/2010 | Shibasaki ............ | G03B 21/204 348/760 |
| 2012/0069578 A1 | 3/2012 | Sakai et al. | |
| 2012/0229780 A1* | 9/2012 | Sato .................... | G02B 19/0057 353/85 |

(Continued)

FOREIGN PATENT DOCUMENTS

| | | |
|---|---|---|
| JP | 05-087727 | 11/1993 |
| JP | 2003-028785 | 1/2003 |

(Continued)

OTHER PUBLICATIONS

U.S. Appl. No. 15/714,163 to Hironori Takeshita et al., filed Sep. 25, 2017.

*Primary Examiner* — Anne M Hines

(74) *Attorney, Agent, or Firm* — Greenblum & Bernstein P.L.C.

(57) ABSTRACT

A light environment producing apparatus includes: a light source; a light diffuser having a translucency; and a case which houses the light source. In addition, the case has a blue non-mirror finished inner surface which is a light diffusing surface. Furthermore, the light diffusing surface receives light emitted from the light source. The light diffuser is fixed to the case so as to allow passage of light diffused by the light diffusing surface.

18 Claims, 4 Drawing Sheets

(56) References Cited

U.S. PATENT DOCUMENTS

| | | | |
|---|---|---|---|
| 2012/0274774 A1* | 11/2012 | Bushee | F21L 4/005 |
| | | | 348/158 |
| 2014/0133125 A1 | 5/2014 | Di Trapani et al. | |
| 2015/0062908 A1* | 3/2015 | Choi | G03B 21/2013 |
| | | | 362/293 |
| 2015/0241621 A1* | 8/2015 | Inui | G02F 1/133615 |
| | | | 349/65 |
| 2016/0281960 A1 | 9/2016 | Di Trapani et al. | |
| 2017/0051893 A1 | 2/2017 | Di Trapani | |
| 2017/0307969 A1* | 10/2017 | Kawasumi | G03B 21/2013 |
| 2018/0017233 A1 | 1/2018 | Takeshita | |

FOREIGN PATENT DOCUMENTS

| | | |
|---|---|---|
| JP | 2014-038792 | 2/2014 |
| JP | 2014-112566 | 6/2014 |
| JP | 2015-184270 | 10/2015 |
| JP | 2015-190905 | 11/2015 |
| JP | 2015-207554 | 11/2015 |
| JP | 2016-514340 | 5/2016 |

\* cited by examiner

LIGHT ENVIRONMENT PRODUCING APPARATUS

CROSS REFERENCE TO RELATED APPLICATIONS

This application claims the benefit of priority of Japanese Patent Application Number 2017-007123 filed on Jan. 18, 2017, the entire content of which is hereby incorporated by reference.

BACKGROUND

1. Technical Field

The present disclosure relates to a light environment producing apparatus, and particularly to a light environment producing apparatus capable of producing an artificial light (outdoor light) environment with a sense of being outside.

2. Description of the Related Art

Window devices including a light source and a sheet-shaped diffusing and reflecting component have conventionally been disclosed (for example, see Japanese Unexamined Utility Model Application Publication No. 05-87727). Such a window device turns on the light source to produce an artificial daytime light environment.

SUMMARY

However, in a light environment produced by such a conventional light environment producing apparatus, it looks like as if the sun were present beside a light diffuser. For this reason, a light source needs to be disposed widely apart from the light diffuser so that the conventional light environment producing apparatus can emit pseudo outdoor light.

It is almost impossible for the conventional light environment producing apparatus, even when being mounted on a building component such as a wall and a ceiling, to reproduce natural sky because the color temperature and luminance of light emitted thereby are even. Here, it is conceivable to reproduce sky using a light source which emits blue light, but it is still difficult to cause emission of pseudo outdoor light.

In view of this, the present disclosure has an object to provide a light environment producing apparatus having reduced dimensions and capable of emitting pseudo outdoor light.

In order to achieve the object, a light environment producing apparatus according to an aspect of the present disclosure includes: a light source; a light diffuser having a translucency; and a housing which houses the light source, wherein the housing has a blue non-mirror finished inner surface which is a light diffusing surface, the light diffusing surface receives light emitted from the light source, and the light diffuser is fixed to the housing so as to allow passage of light diffused by the light diffusing surface.

According to the present disclosure, the light environment producing apparatus can have reduced dimensions and emit pseudo outdoor light.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
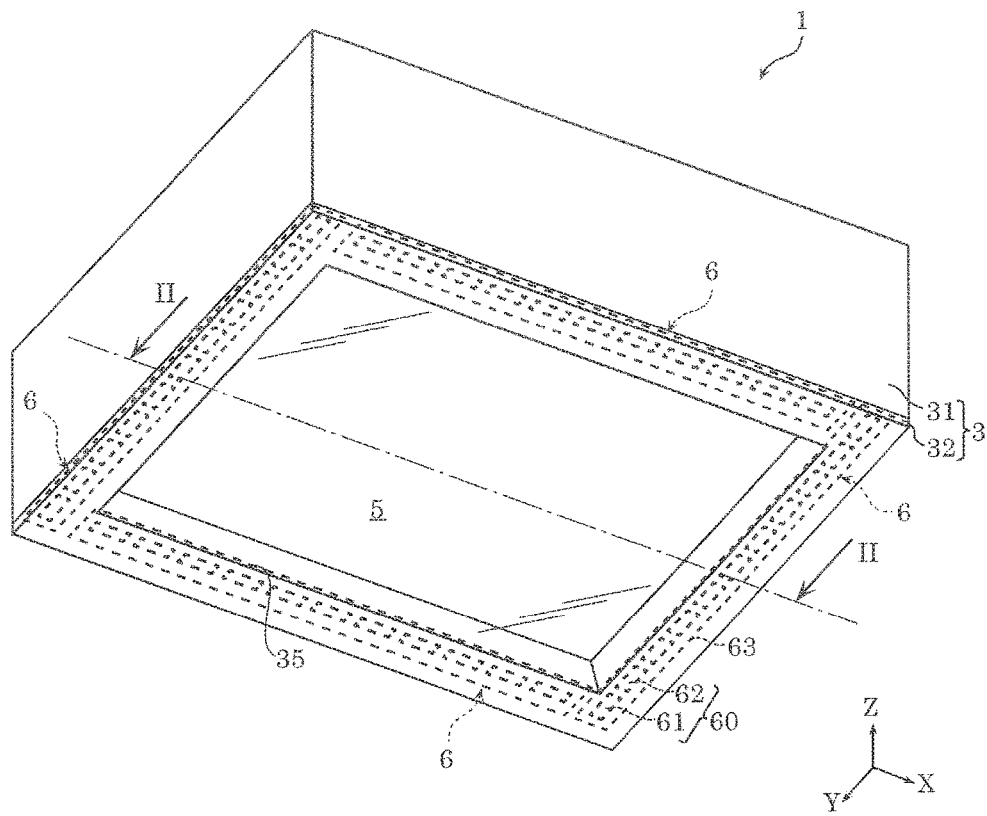
FIG. 1 is a schematic view of a light environment producing apparatus according to an embodiment.

Underlying Knowledge Forming Basis of the Present Disclosure

When artificial light (outdoor light) made to look like natural sky enters a room through a window, the color temperature and luminance change gradually. For this reason, when pseudo outdoor light is produced using a light environment producing apparatus, how to emit the pseudo outdoor light is a crucial problem.

For example, when trying to produce a near natural light receiving environment using a normal lighting device, the lighting device emits even light in which luminance, color etc. are controlled to be even, and, in the environment of such even light, it is difficult for a user to have a sense of depth as obtainable when seeing real sky. For this reason, even when such a normal lighting device is mounted on a ceiling, a wall, or the like, a light environment produced thereby inevitably causes a user to have a feeling of entrapment.

If pseudo outdoor light can be emitted in a facility in which it is almost difficult to receive outdoor light due to its design, the pseudo outdoor light can allow a user to have a feeling of release or to be relaxed.

In view of this, for example, a conventional light environment apparatus includes a light diffuser in an opening portion formed in a ceiling, a wall, or the like of a meeting room, and a light source is disposed around (the outer circumference side of) the light diffuser. Light emitted from the light source is dispersed by the light diffuser, it is possible to image incident of outdoor light.

However, the light environment producing apparatus having a configuration in which the light source is disposed around the light diffuser cannot emit pseudo outdoor light, and in a light environment produced thereby, it looks like as if the sun were present beside the light diffuser. For this reason, the light source needs to be disposed widely apart from the light diffuser, which inevitably increases the dimensions of the light environment producing apparatus.

In view of this, there have been demands for light environment producing apparatuses which can have reduced dimensions and emit pseudo outdoor light.

Hereinafter, an embodiment and variations of the embodiment of the present disclosure is described with reference to the drawings. Each of the embodiment and the variations described below indicates a general or specific example of the present disclosure. Accordingly, the numerical values, shapes, materials, constituent elements, the arrangement and connection of the constituent elements, etc. shown in the following exemplary embodiment and variations are mere examples, and therefore do not limit the scope of the appended Claims and their equivalents. Therefore, among the constituent elements in the following exemplary embodiments and variations, constituent elements not recited in any one of the independent claims are described as arbitrary constituent elements.

It is to be noted that, taking "approximately the same" as an example, the phrase of "approximately . . ." used herein is intended to cover, not only "completely the same" but also "substantially the same".

Each diagram is a schematic diagram, and thus is not always precisely illustrated. In each diagram, substantially the same elements are assigned with the same reference numerals, and overlapping descriptions are omitted or simplified.

Hereinafter, a light environment producing apparatus according to an embodiment of the present disclosure is described.

Embodiment

[Configuration]

First, the configuration of light environment producing apparatus 1 according to this embodiment is described with reference to FIGS. 1 to 3.

FIG. 1 is a schematic view of light environment producing apparatus 1 according to this Embodiment. FIG. 2 is a cross-sectional view of light environment producing apparatus 1 according to this embodiment when cut along line II-II. FIG. 3 is a block diagram of light environment producing apparatus 1 according to this embodiment.

In FIG. 1, the height (thickness) direction of light environment producing apparatus 1 is defined as a Z-axis direction, the direction crossing the Z-axis direction is defined as a Y-axis direction, and the direction orthogonal to the Z-axis direction and the Y-axis direction is defined as an X-axis direction. Directions in FIG. 2 and following diagrams are all the same as the directions in FIG. 1.

As illustrated in FIG. 1, light environment producing apparatus 1 is an apparatus capable of producing a light (pseudo outdoor light) environment with a sense of being outside. Light environment producing apparatus 1 is an apparatus for emitting light disposed on a ceiling, a wall, or the like of a facility, and may be mounted particularly in a facility in which it is difficult to receive natural light. Light environment producing apparatus 1 may be mounted to be embedded into a building component.

Figure 3:
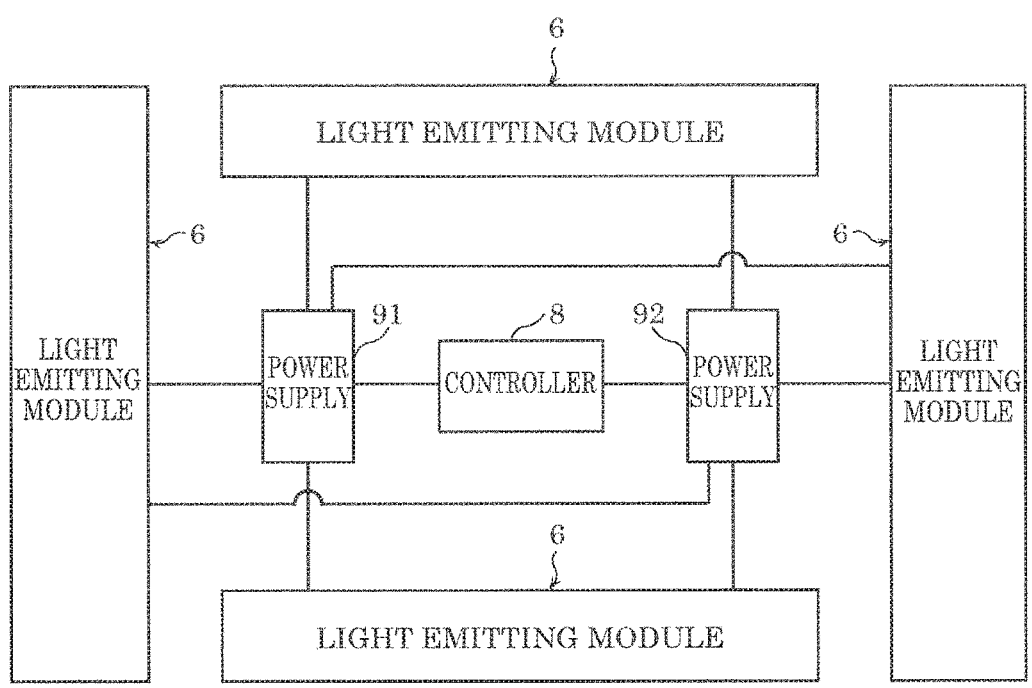
FIG. 3 is a block diagram of the light environment producing apparatus according to the embodiment.

As illustrated in FIGS. 1 and 3, light environment producing apparatus 1 includes; case 3 (an example of a housing): light diffusers 5; light emitting modules 6; controller 8; and two power supplies 91 and 92.

Case 3 is a thin box having an approximately rectangular shape in a plan view. It is to be noted that the shape of case 3 is not limited to the rectangular shape and any particular shapes, and may be a circular shape, a polygonal shape, a semi-circular shape, or the like.

Case 3 has housing portion 31 and frame 32.

Figure 2:
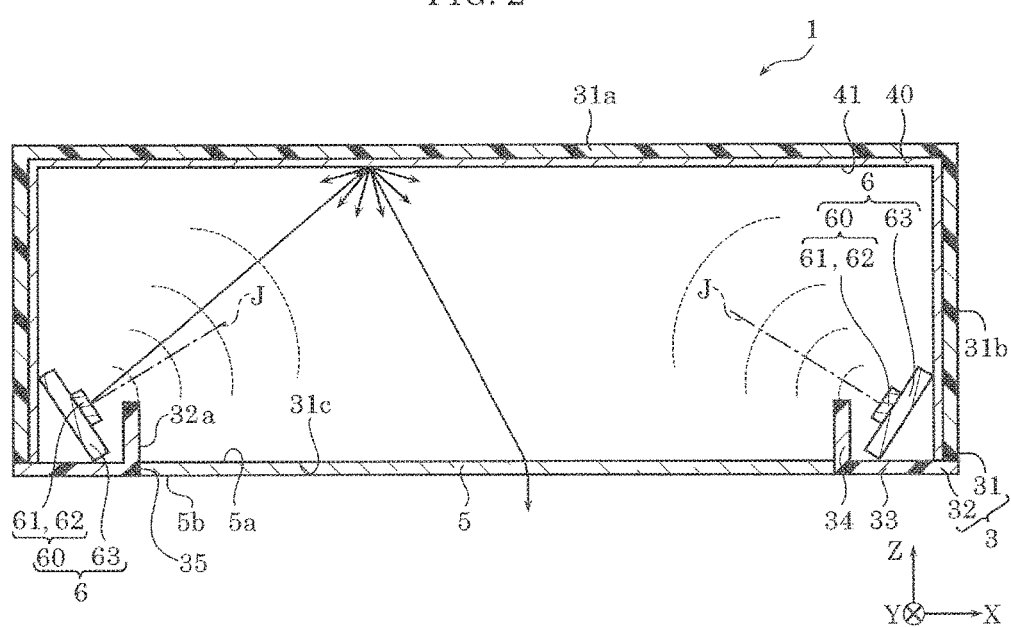
FIG. 2 is a cross-sectional view of the light environment producing apparatus according to the embodiment when cut along line II-II.

As illustrated in FIGS. 2 and 3, housing portion 31 is a thin box which houses at least light emitting modules 6. Housing opening portion 31c which opens on the negative direction side of Z axis is formed in housing portion 31. Controller 8 and two power supplies 91 and 92 may be housed in or provided outside housing portion 31.

As illustrated in FIG. 2, in this embodiment, light diffusing layer 40 for diffusing light is stacked on each of one or more inner surfaces of housing portion 31. The inner surface of light diffusing layer 40 is light diffusing surface 41 for diffusing light (the inner surface is opposite to the surface in contact; with housing portion 31).

Light diffusing surface 41 is a non-mirror finished surface colored in a color containing blue. The color containing blue means a color which can be recognized as blue when a person sees light diffusing surface 41. Light diffusing surface 41 achieves a direct reflection of at most 20% of reflected light. It should be noted that housing portion 31 may be made of the same material as the material of light diffusing layer 40.

Light diffusing surface 41 may be a surface formed by, for example, applying a resin material, a metal material, or the like to the inner surface of housing portion 31. Alternatively, light diffusing surface 41 may be a surface formed by attaching chemical fibers, cellulose fibers, or the like to an inner surface of housing portion 31, or a suede-like surface. In other words, light diffusing surface 41 has been matt finished so that incident light is easy to be diffused thereby. In short, light diffusing surface 41 is a non-polished surface which has been matt finished. In this embodiment, a material containing aluminum powder is applied to the inner surface of housing portion 31. In this embodiment, light diffusing surface 41 is evenly colored by a color containing blue.

Housing portion 31 includes bottom wall 31a having an approximately plate shape and side waits 31b.

Each side wall 31b is a tubular body enclosing the outer circumference of bottom wall 31a, and has an approximately rectangular shape when bottom wall 31a is seen in a plan view. The edge on the negative direction side of Z axis of side wall 31b is housing opening portion 31c. Light diffusing surface 41 is formed on the inner circumferential surface of side wall 31b. More specifically, light diffusing layer 40 is stacked on the inner circumferential surface of side wall 31b, and the inner circumferential surface of light diffusing layer 40 is light diffusing surface 41 (the inner circumferential surface is opposite to the surface of light diffusing layer 40 on which light diffusing layer 40 is in contact with side wall 31b). In this embodiment, four light diffusing surfaces 41 are formed on side walls 31b.

Bottom wall 31a is mounted at a position at the edge on the positive direction side of Z axis of housing portion 31 and at the edge on the positive direction side of Z axis of side wall 31b. Light diffusing surface 41 is formed on the surface on the negative direction side of Z axis of bottom wall 31a. More specifically, light diffusing layer 40 is stacked on the surface on the negative side of Z axis of bottom wall 31a, and the surface on the negative direction side of Z axis of light diffusing layer 40 is light diffusing surface 41. In other words, five light diffusing surfaces 41 are formed on the inner circumferential surfaces of housing portion 31.

Frame 32 is, for example, a member having an approximately rectangular shape in a plan view. Frame 32 is mounted at the edge on the negative direction side of Z axis in housing portion 31 so as to cover housing opening portion 31c. In other words, frame 32 is mounted on the negative direction side of Z axis of housing portion 31 to be overlapped with the outer circumferential side of housing portion 31 in a plan view. It is to be noted that frame 32 may he designed to have a window-like appearance which provides a user with a sense of receiving real outdoor light. It is to be noted that the shape of frame 32 is not limited to the rectangular shape and any particular shapes, and may be a circular shape, a polygonal shape, a semi-circular shape, or the like.

Frame 32 has frame body 33 and rising walls 34.

Frame body 33 encloses opening portion 35 formed to have an approximately rectangular shape. Light dispersed on light diffusing surfaces 41 passes through opening portion 35. Light diffuser 5 is mounted in opening portion 35. Frame body 33 is mounted at the edge on the negative direction side of Z axis of housing portion 31.

Each rising wall 34 is a rising wail which defines opening portion 35 and protrudes inward of housing 31 from opening portion 35. Rising wall 34 is mounted so that light emitted from light source 60 of each light emitting module 6 directly enters light diffuser 5. Rising wall 34 is disposed to cross a straight line which connects light source 60 of light emitting module 6 and light. diffuser 5. In other words, rising wall 34 shields light from light source 60 of light emitting module 6 to light diffuser 5.

Inner circumferential surface 32a of frame 32 is black or blue which reduces reflection of light. For example, inner circumferential surface 32a may be colored in black or blue, and be matt finished in order to reduce reflection of light. It is to be noted that frame 32 may be made of a black or blue material which reduces reflection of light. Inner circumferential surface 32a when formed in black is easy to absorb light. Inner circumferential surface 32a when formed in blue is similar in color to light diffusing surface 41 of housing portion 31. In other words, light reflected on inner circumferential surface 32a makes luminance unevenness and color unevenness on light diffuser 5 less noticeable.

Light diffuser 5 is a rectangular plate-shaped member in a plan view, and is fixed to case 3 so as to allow passage of light diffused by light diffusing surface 41. Light diffuser 5 is disposed to face bottom wall 31a of case 3. Bottom wall 31a. is a part of light diffusing surface 41. In this embodiment, light diffuser 5 is fixed to frame 32 to face bottom wall 31a of case 3.

Light diffuser 5 has translucency and a light diffusing property. Light diffuser 5 has light entrance surface 5a and light exit surface 5b. Light entrance surface 5a is, for example, a surface that light diffused by light diffusing surface 41 enters. Light exit surface 5b is, for example, a surface through which light entered light entrance surface 5a passes light diffuser 5 and is emitted.

Light diffuser 5 is, for example, matt enough to prevent the texture of the inner surfaces of case 3 from being visually recognized. Cloudiness (a haze value) of light diffuser 5 is, for example, in a range approximately from 10% to 90%. Here, cloudiness means an amount defined according to (diffuse transmittance/total transmittance)×100. Diffuse transmittance means a ratio of the amount of light emitted at a predetermined emission angle or above (for example, ±5 degrees with respect to parallel light entered light diffuser 5) among light emitted from light diffuser 5 with respect to the total amount of incident light when the parallel light entered light diffuser 5. When the cloudiness of light diffuser 5 exceeds the predetermined value, the diffuse transmittance of light increases, and thus it is difficult for light environment producing apparatus 1 to produce a near natural light receiving environment.

Light diffuser 5 is configured using, as a base material, acryl, a resin material such as poly ethylene terephthalate, or glass. Light diffuser 5 may be a semitranslucent diffuser panel which contains dispersed therein a light diffusing material. Such a diffuser panel may be fabricated by forming a translucent resin material in which light diffusing material is mixed to have a predetermined shape. Light reflective fine particulates such as silica particles may be used as a light diffusing material.

Alternatively, light diffuser 5 may be configured by forming a semitranslucent light diffusing film containing a light diffusing material etc. on an inner surface or an outer surface of a translucent panel instead of dispersing the light diffusing material inside.

Furthermore, light diffuser 5 may be configured to have a light diffusing property by performing a diffusion process instead of using the light diffusing material. For example, it is also good to configure light diffuser 5 by: forming micro projections and depressions on the surface of the translucent panel by performing a surface finishing process such as emboss processing; or printing a dot pattern on the surface of the translucent panel. In this case, for example, light diffuser 5 has a size with which it is impossible to visually recognize the texture of micro projections and depressions. Even when performing a diffusion process, a light diffusing material may he further contained in light diffuser 5 in order to increase the light diffusing property.

Light emitting modules 6 have different light colors. Each light emitting module 6 is a module including light source 60 and wiring board 63 on which light source 60 is disposed. In this embodiment, four light emitting modules 6 are arranged on a surface on the positive direction side of Z axis of frame body 33, along frame body 33 of frame 32. The number of light emitting modules 6 is not limited to four, and may be three or less, or five or more.

Light emitting module 6 is disposed in case 3 in an attitude that allows emission of light toward light diffusing surface 41. More specifically, light emitting module 6 is disposed in case 3 in the attitude that allows light axis J of each of white light source 61 and blue light source 62 to cross light diffusing surface 41 of bottom wall 31a in frame 32. In this embodiment, optical axis J of each of white light sources 61 and blue light sources 62 crosses around the center of light diffusing surface 41 in bottom wall 31a. In other words, optical axis J of light source 60 faces the center part (an area including the center) of light diffusing surface 41. In this embodiment, optical axis J of light source 60 crosses light diffusing surface 41 of bottom wall 31a. However, it is to he noted that optical axis J of light source 60 may cross light diffusing surface 41 of side wall 31b of frame 32, and is not limited to the center part.

Light source 60 includes at least one of white light source 61 which emits white light and blue light source 62 which emits blue light this embodiment, light source 60 includes a plurality of white light sources 61 and a plurality of blue light sources 62. White light sources 61 and blue light sources 62 are arranged approximately in parallel to the lengthwise direction of wiring board 63. White light sources 61 and blue light sources 62 may be arranged on wiring board (33 alternately. Alternatively, a plurality of white light sources 61 and a plurality of blue light sources 62 may be arranged on wiring board 63 alternately.

White light sources 61 emit white light. White light does not strictly mean white light, and means light which normally looks white. Blue light sources 62 emit blue light. Blue light does not strictly mean blue light, and means light which normally looks blue.

As illustrated in FIGS. 1 and 3, each of white light sources 61 and blue light sources 62 may be what is called a surface mount device (SMD) type light emitting diode (LED). An SMD type LED element is specifically a package type LED element which has a cavity formed by resin forming and in which an LED chip (light emitting element) is enclosed. White light sources 61 and blue light sources 62 turn on, adjust light (adjust brightness), and turn off under control of controller 8. Dimming control (brightness control) and toning control (light color control) of white light sources 61 and blue light sources 62 are performed by means of controller 8 controlling power supplies 91 and 92 separately or at the same time (by adjusting the amounts of power to be supplied thereto). In this embodiment, light emitting module 6 may be capable of performing dimming control and toning control.

Controller 8 controls operations such as turning on, turning off, dimming, and toning (light color or color temperature adjustment) etc. of light emitting modules 6 according to instructions (control signals via a remote controller etc.) from a user. Controller 8 performs dimming control of white light sources 61 and blue light sources 62. Examples of dimming control include increasing brightness of white light sources 61 by controlling power supply 91, and decreasing brightness of blue light sources 62 by controlling power supply 92. Controller 8 is configured with, for example, a circuit for controlling light emitting modules 6. Controller 8 performs these operations by being configured with a micro computer, a processor or the like, or an exclusive circuit for controlling, for example, the value of current to he supplied to light emitting modules 6 according to an input signal.

Each of two power supplies 91 and 92 is configured with a power supply circuit which generates power for causing corresponding one of light emitting modules 6 to emit light. For example, each of two power supplies 91 and 92 converts power supplied from a power system to a direct current power at a predetermined level by performing rectification, smoothing, voltage decrease, etc., and supplies the direct current power to the corresponding one of light emitting modules 6. Two power supplies 91 and 92 are electrically connected by a control line, a power line of the power system, or the like.

Power supply 91 supplies power to each of white light sources 61, and power supply 92 supplies power to each of blue light sources 62. Each of two power supplies 91 and 92 starts and stops supply of power to the corresponding one of light emitting modules 6 under control of controller 8. For example, when receiving a turn-on operation via an operation portion of a remote controller or the like, controller 8 causes two power supplies 91 and 92 to supply power to light emitting modules 6, thereby turning on white light sources 61 and blue light sources 62 of light emitting modules 6. As another example, when a turn-off operation is received via the operation portion, controller 8 causes two power supplies 91 and 92 to stop supplying power to light emitting modules 6, thereby turning off white light sources 61 and blue light sources 62 of light emitting modules 6.

Light emitted from white light sources 61 and blue light sources 62 in light environment producing apparatus 1 enters light diffusing surface 41 of bottom wall 31a in case 3 and diffuses Since light diffusing surface 41 is a blue non-mirror surface, the light, diffused by light diffusing surface 41 has blue light components (blue light). Part of the light, diffused by light diffusing surface 41 of bottom wall 31a enters light entrance surface 5a of light diffuser 5. The light entered light entrance surface 5a of light diffuser 5 is partly diffused by light diffuser 5, and is partly reflected on light entrance surface 5a of light diffuser 5 and travels toward bottom wall 31a. The light travels toward bottom wall 31a is diffused by light diffusing surface 41 again.

Since the light diffused by blue light diffusing surface 41 and also diffused by light diffuser 5 is emitted from light exit surface 5b of light diffuser 5 in this way, pseudo outdoor light is emitted from light environment producing apparatus 1 having reduced dimensions.

The light emitted from white light sources 61 and blue light sources 62 is repeatedly reflected and diffused by light diffusing surface 41 of bottom wall 31a and light entrance surface 5a of light diffuser 5. Thus, there is no need to arrange white light sources 61 and blue light sources 62 widely apart from light diffuser 5.

Furthermore, light environment producing apparatus 1 is capable of forming light exit surface 5b of light diffuser 5 to have a gradation pattern appearance by performing toning control of white light sources 61 and blue light sources 62. For example, by means of controller 8 decreasing brightness of light to be emitted from blue light sources 62 and increasing brightness of light to be emitted from white light sources 61, gradation blue light whose color gradually changes from light blue to dark blue with an increase in the distance from white light sources 61 is emitted from light exit surface 5b of light diffuser 5. For this reason, it is possible to produce a light environment in which a user can feel the sun. On the other hand, by means of controller 8 increasing brightness of light to be emitted from blue light sources 62 and decreasing brightness of light to be emitted from white light sources 61, gradation blue light which allows a user to feel depth as if the sun were present outside light diffuser 5 is emitted from light exit surface 5b of light diffuser 5.

[Effects]

Next, effects provided by light environment producing apparatus 1 according to this embodiment is described.

As described above, a light environment producing apparatus according to this embodiment includes: light source 60; light diffuser 5 having a translucency; and case 3 which houses light source 60. In addition, case 3 has a blue non-mirror finished inner surface which is light diffusing surface 41. Furthermore, light diffusing surface 41 receives light emitted from light source 60. Light diffuser 5 is fixed to case 3 so as to allow passage of light diffused by light diffusing surface 41.

In this way, when light is emitted on light diffusing surface 41 which is a blue non-mirror surface, the light diffused by light diffusing surface 41 is further diffused by light diffuser 5 when passing through light diffuser 5, and then is emitted. For this reason, since pseudo outdoor light is emitted from light diffuser 5, it is possible to produce a near natural light receiving environment.

In addition, since light environment producing apparatus 1 is configured so that light emitted from light source 60 is diffused by light diffusing surface 41 and enters light entrance surface 5a of light diffuser 5, it is possible to dispose light source 60 near light diffuser 5.

Accordingly, light environment producing apparatus 1 can have reduced dimensions and emit pseudo outdoor light.

Since light diffuser 5 is provided to light environment producing apparatus 1, the texture which is an inside structure of light environment producing apparatus 1 is less visually noticeable even when light emitting modules 6 are off. For this reason, the near natural light receiving environment is less affected.

In particular, light environment producing apparatus 1 is capable of producing the near natural light receiving environment while it is simply configured with light sources 60, case 3 having light diffusing surfaces 41 for diffusing blue light, and light diffuser 5. Thus, the manufacturing cost is less costly.

Light environment producing apparatus 1 according to this embodiment further includes frame 32 having opening portion 35 through which light passes. Frame 32 is mounted to cover light source 60 in a plan view. Light diffuser 5 is fixed to frame 32 to cover opening portion 35.

Since frame 32 covers light source 60 when frame 32 is seen in a plan view in this way, unnatural luminance and color unevenness of light emitted from light source 60 is less visually noticeable. For this reason, the near natural light receiving environment is less affected.

In light environment producing apparatus 1 according to this embodiment, frame 32 has rising wall 34 which defines opening portion 35 and protrudes inward of case 3 from opening portion 35.

In this way, since rising wall 34 defines opening portion and protrudes inside of case 3 from opening portion 35, light to be emitted from light source 60 can be shielded. For this reason, even when light environment producing apparatus 1 is seen from outside of light diffuser 5, unnatural luminance and color unevenness of light is less visually noticeable.

In light environment producing apparatus 1 according to this embodiment, frame 32 has black or blue inner circumferential surface 32a which reduces reflection of light.

Since reflection of light entered inner circumferential surface 34a of rising wall 34 is reduced in this way, inner circumferential surface 34a is less noticeable when being reflected on light diffuser 5. For this reason, the near natural light receiving environment is less affected.

In light environment producing apparatus 1 according to this embodiment, light diffuser 5 is disposed to face bottom wall 31a of case 3. Bottom wall 31a is a part of light diffusing surface 41a. Light source 60 is disposed in case 3 in an attitude that allows light axis J of light source 60 to cross bottom wall 31a of case 3.

Since light applied to light diffusing surface 41 of bottom wall 31a of case 3 is diffused and enters light diffuser 5 opposing bottom wall 31a, it is possible to emit pseudo outdoor light.

In light environment producing apparatus 1 according to this embodiment, light source 60 includes at least one of white light source 61 which emits white light and blue light source 62 which emits blue light.

Since at least one of white light and blue light is applied to light diffusing surface 41 in this way, light environment producing apparatus 1 can emit pseudo outdoor light.

In light environment producing apparatus 1 according to this embodiment, light diffusing surface 41 achieves a direct reflection of at most 20% of reflected light Since 80% or more of the light reflected on light diffusing surface 41 is diffused and reflected, it is possible to produce the near natural light receiving environment.

In light environment producing apparatus 1 according to this embodiment, rising wall 34 is disposed to cross a straight line which connects light source 60 and light diffuser 5.

In light environment producing apparatus 1 according to this embodiment, light source 60 is disposed in case 3 in an attitude that allows light axis J of light source 60 to cross the center part of light diffusing surface 41.

In light environment producing apparatus 1 according to this embodiment, light source 60 includes one or more white light sources 61 each of which emits white light and one or more blue light sources 62 each of which emits blue light. Light environment producing apparatus 1 further includes light emitting module 6 which has wiring board 63 on which the one or more white light sources 61 and the one or more blue light sources 62 are mounted. The one or more white light sources 61 and the one or more blue light sources 62 are arranged on wiring board 63 alternately on a basis of a predetermined number of light sources.

In light environment producing apparatus 1 according to this embodiment, light diffuser 5 has a cloudiness ranging from 10% to 90%.

In light environment producing apparatus 1 according to this embodiment, light diffuser 5 is a Rayleigh diffuser which causes Rayleigh scattering of incident light.

In light environment producing apparatus 1 according to this embodiment, light diffusing surface 41 is made of at least one of a resin material, a metal material, a chemical fiber, and a cellulose fiber.

In light environment producing apparatus 1 according to this embodiment, light diffuser 5 contains dispersed therein a light diffusing material.

In light environment producing apparatus 1 according to this embodiment, light diffuser 5 has a light diffusing film on an inner or outer surface of light diffuser 5. The light diffusing film contains a light diffusing material.

In light environment producing apparatus 1 according to this embodiment, light diffuser 5 has a surface having a micro uneven structure.

Light environment producing apparatus 1 according to this embodiment further includes a controller which performs dimming control or toning control of light source 60.

Variation 1 of Embodiment

[Configuration]

A configuration of light environment producing apparatus 100 according to this variation is described with reference to FIGS. 4 and 5.

Figure 4:
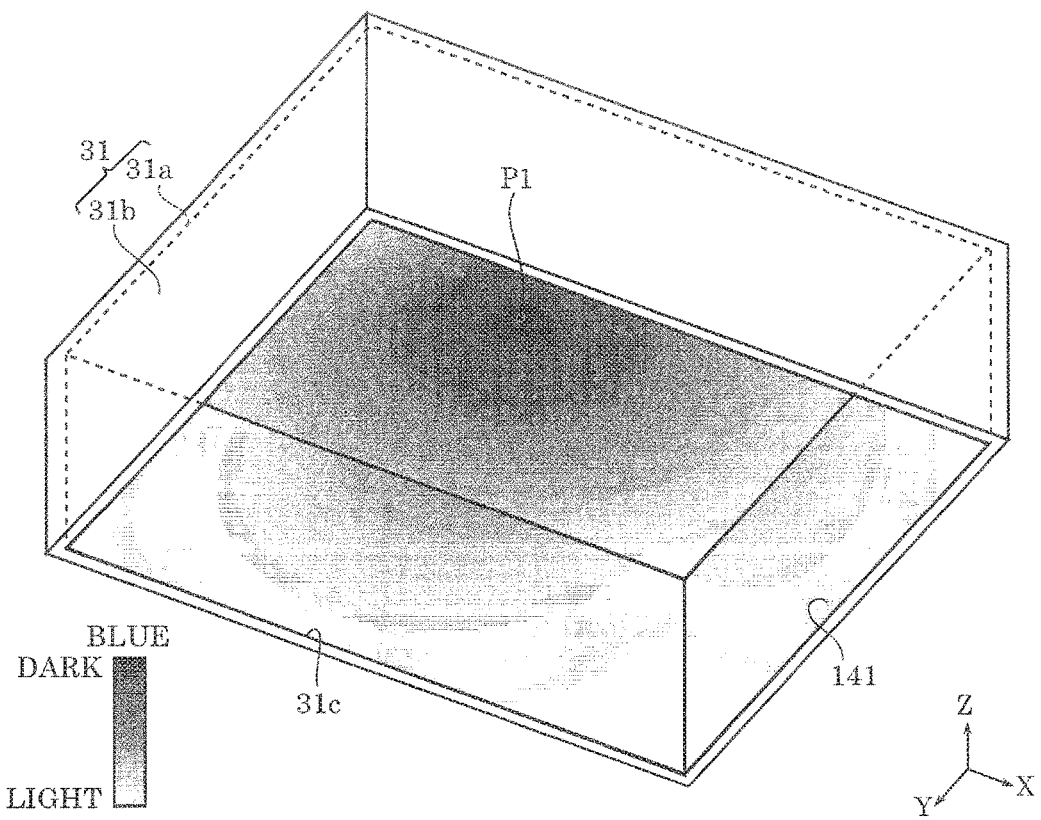
FIG. 4 is a diagram illustrating a gradation pattern on an internal surface of a housing in a light environment producing apparatus according to Variation 1 of the embodiment.

FIG. 4 is a diagram illustrating a color gradation pattern of an inside surface of housing portion 31 in light environment producing apparatus 100 according to this variation. FIG. 5 is an image diagram illustrating a light exit surface of light environment producing apparatus 100 according to this variation. In FIG. 4, the thickness of light diffusing layer 40 is not illustrated.

In light environment producing apparatus 100 according to this variation, light diffusing surface 141 of housing portion 31 has the color gradation pattern, unlike light environment; producing apparatus 1 in which light diffusing surface 41 of housing portion 31 has an even color.

Light environment producing apparatus 100 according to this variation has the same constituent elements as those of light environment producing apparatus 1 unless otherwise specified. Thus, the same constituent elements are assigned the same reference signs and detailed descriptions thereof are not repeated.

As illustrated in FIG. 4, the inner surface of housing portion 31 has a blue gradation pattern in which dark blue gradually changes to light blue with an increase in the distance from the center of housing portion 31. Specifically, in this variation, an almost center of bottom wall 31a in housing portion 31 is set to be reference position P1, and blue is gradually reduced with an increase in the distance from reference position P1.

Figure 5:
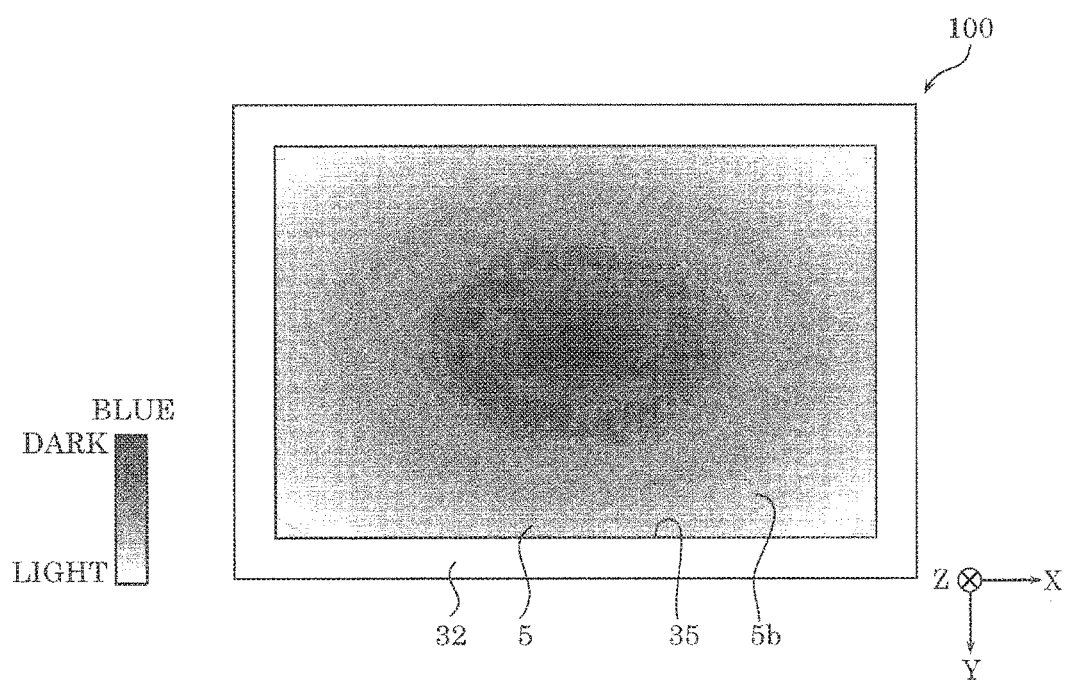
FIG. 5 is an image diagram illustrating distribution of light emitted by the light environment producing apparatus according to Variation 1 of the embodiment.

When light source 60 emits light in light environment producing apparatus 100, as illustrated in FIG. 5, blue light is emitted from the center portion of light diffuser 5 in light environment producing apparatus 100, and blue light that gradually changes (from blue light to whitish light) with an increase in the distance from the center part is emitted.

In light environment producing apparatus 100 according to this variation, light diffusing surface 141 has a blue gradation pattern in which dark blue gradually changes to light blue with an increase in the distance from reference position P1.

Since light emitted from light diffuser 5 gradually changes from dark blue light to light blue light in this way, it is possible to produce an almost natural light receiving environment.

In addition to this effect in this variation, this variation provides the same effects as those obtainable in the embodiment Variation 2 of Embodiment

[Configuration]

A configuration of light environment producing apparatus 200 according this variation is described with reference to FIGS. 6 and 7.

Figure 6:
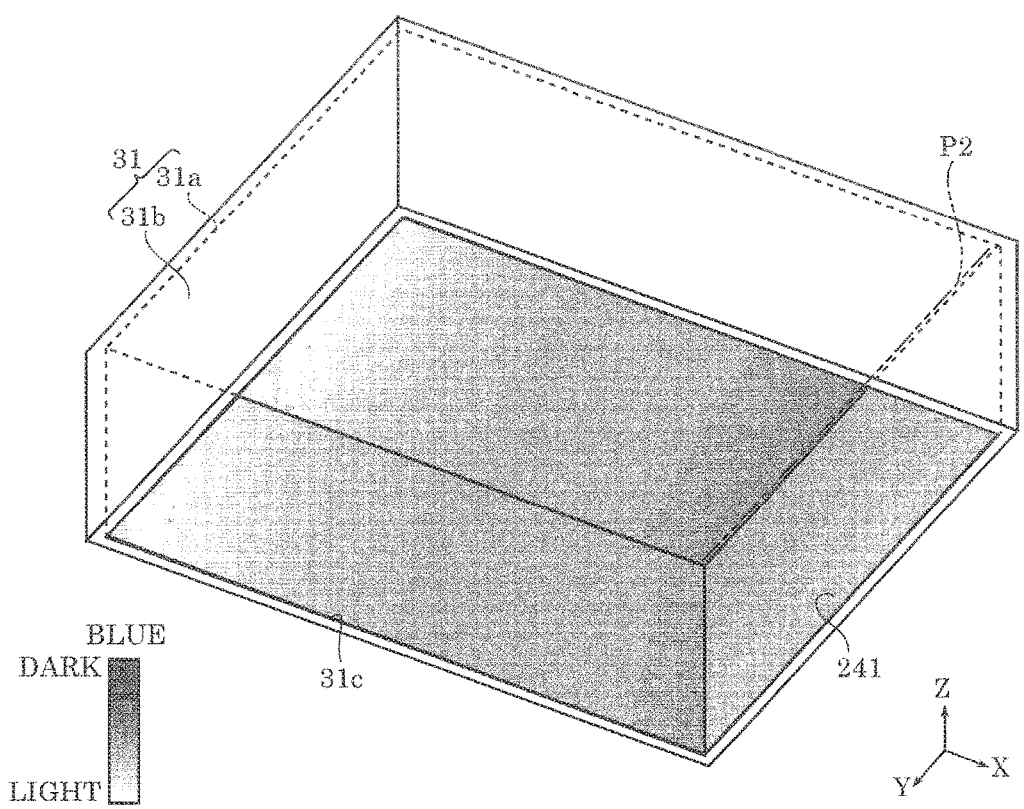
FIG. 6 is a diagram illustrating a gradation pattern on an internal surface of a housing in a light environment producing apparatus according to Variation 2 of the embodiment.

FIG. 6 is a diagram illustrating a gradation pattern of an inner surface of housing portion 31 in light environment producing apparatus 200 according to this variation. FIG. 7 is an image diagram illustrating a light distribution of light environment producing apparatus 200 according to this variation. In FIG. 6, the thickness of light diffusing layer 40 is not illustrated.

In light environment producing apparatus 200 according to this variation, light diffusing surface 241 of housing portion 31 has a color gradation pattern, unlike light environment producing apparatus 1 in which light diffusing surface 41 of housing portion 31 has an even color. The gradation pattern in this variation differs from that of Variation 1 of the embodiment.

Light environment producing apparatus 200 according to this variation has the same constituent elements as those of light environment producing apparatus 1 unless otherwise specified. Thus, the same constituent elements are assigned the same reference signs and detailed descriptions thereof are not repeated.

As illustrated in FIG. 6, in this variation, reference position P2 is represented by alternate long and two short dashes lines. In housing portion 31, blue is lighter with an increase in the distance from reference position P2 of bottom wall 31a.

Figure 7:
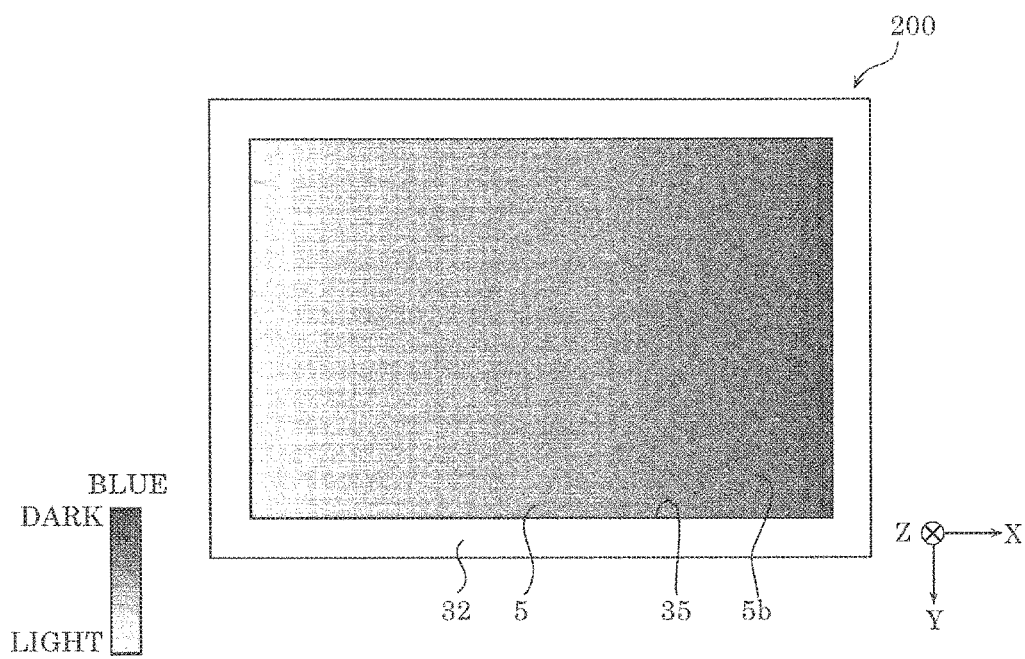
FIG. 7 is an image diagram illustrating a distribution of light emitted by the light environment producing apparatus according to Variation 2 of the embodiment.

When light source 60 emits light in light environment producing apparatus 200, blue light is emitted as illustrated in FIG. 7. The blue light gradually changes from dark blue light to light blue light (that is whitish blue color) in the direction from one of edges to the other edge of light diffuser 5 in light environment producing apparatus 200.

In addition to this effect in this variation, this variation provides the same effects as those obtainable in the embodiment.

Other Variations Etc.

Hereinafter, although the present disclosure has been described based on the embodiment and Variations 1 and 2, the present disclosure is not limited to the embodiment and Variations 1 and 2.

For example, in the above embodiment, a Rayleigh diffuser which causes Rayleigh scattering of incident light may be used as an example of a light diffuser. A Rayleigh diffuser is a member made by using, as a base material, a resin such as acryl having translucency and by dispersing a nano composite material inside. Examples of such a nano composite material include metal oxides such as a titanium oxide, a zinc oxide, and a zirconia oxide. When the diameter of grains of a nano composite material is sufficiently smaller than the wavelength of light, Rayleigh scattering of light entered a light diffuser is caused.

In the above embodiment, a plurality of white light sources and a plurality of blue light sources are not limited to those configured as described above. It is also good to use chip on board (COB) type modules in which LED chips are mounted directly on a wiring board. Light emitting elements included in a plurality of white light sources and a plurality of blue light sources are not limited to LEDs. For example, it is also good to use semiconductor light emitting elements such as semiconductor lasers etc. or other solid state light emitting elements which are for example electro luminescence (EL) elements such as organic EL elements and inorganic EL elements.

In the above embodiment, the controller may have a timer function. The controller may perform dimming control and toning control by, for example, using the timer function when a predetermined time is reached (the predetermined time elapsed).

Although the operation portion is electrically connected to the light environment producing apparatus in any of the above embodiment and variations thereof, it is to be noted that a remote controller which performs wireless communication may operate (turn on, turn off, etc.) the light environment producing apparatus. Wireless communication is performed by providing the light environment, producing apparatus with a communication circuit for performing wireless communication with the remote controller. The communication circuit is, for example, a device having a near distance wireless communication function such as ZigBee (registered trademark), (registered trademark), and Bluetooth (registered trademark).

The present disclosure includes embodiments obtainable by adding various kinds of modifications that a person skilled in the art may arrive at and embodiments obtainable by arbitrarily combing some of the constituent elements and functions in the embodiment and Variations 1 and 2 of the embodiment within the scope of the present disclosure, in addition to the embodiment and Variations 1 and 2.

What is claimed is:

1. A light environment producing apparatus, comprising a light source;
a light diffuser having a translucency; and
a housing which houses, the light source,
wherein the housing has a blue non-mirror finished inner surface which is a light diffusing surface,
the light diffusing surface receives light emitted from the light source, and
the light diffuser is fixed to the housing so as to allow passage of light diffused by the light diffusing surface.

2. The light environment producing apparatus according to claim 1, further comprising:
a frame having an opening portion through which light passes,
wherein the frame is mounted to cover the light source in a plan view, and
the light diffuser is fixed to the frame to cover the opening portion.

3. The light environment producing apparatus according to claim 2,
wherein the frame has a rising wall which defines the opening portion and protrudes inward of the housing from the opening portion.

4. The light environment producing apparatus according to claim 3, wherein the rising wall is disposed to cross a straight line which connects the light source and the light diffuser.

5. The light environment producing apparatus according to claim 2,
wherein the frame has a black or blue inner circumferential surface which reduces reflection of light.

6. The light environment producing apparatus according to claim 1,
wherein the light diffuser is disposed to face a bottom of the housing, the bottom being a part of the light diffusing surface, and
the light source is disposed in the housing in an attitude that allows a light axis of the light source to cross the bottom of the housing.

7. The light environment producing apparatus according to claim 1,
wherein the light source is disposed in the housing in an attitude that allows a light axis of the light source cross a center part of the light diffusing surface.

8. The light environment producing apparatus according to claim 1,
wherein the light diffusing surface has a blue gradation pattern in which dark blue gradually changes to light blue with increase in distance from a reference position.

9. The light environment producing apparatus according to claim 1,
wherein the light source includes at least one of a white light source which emits white light and a blue light source which emits blue light.

10. The light environment producing apparatus according to claim 1,
wherein the light source includes one or more white light sources each of which emits white light and one or more blue light sources each of which emits blue light,
the light environment producing apparatus further comprises light emitting module which has a wiring board on which the one or more white light sources and the one or more blue light sources are mounted,
wherein the one or more white light sources and the one or more blue light sources are arranged on the wiring board alternately on a basis of a predetermined number of light sources.

11. The light environment producing apparatus according to claim 1,
wherein the light diffusing surface achieves a direct reflection of at most 20% of reflected light.

12. The light environment producing apparatus according to claim 1,
wherein the light diffuser has a cloudiness ranging from 10% to 90%.

13. The light environment producing apparatus according to claim 1,
wherein the light diffuser is a Rayleigh diffuser which causes Rayleigh scattering of incident light.

14. The light environment producing apparatus according to claim 1,
wherein the light diffusing surface is made of at least one of a resin material, a metal material, a chemical fiber, and a cellulose fiber.

15. The light environment producing apparatus according to claim 1,
wherein the light diffuser contains dispersed therein a light diffusing material.

16. The light environment producing apparatus according to claim 1,
wherein the light diffuser has a light diffusing film on an inner or outer surface of the light diffuser, the light diffusing film containing a light diffusing material.

17. The light environment producing apparatus according to claim 1,
wherein the light diffuser has a surface having a micro uneven structure.

18. The light environment producing apparatus according to claim 1, further comprising:
a controller which performs dimming control or toning control of the light source.

* * * * *